APPARATUS AND METHOD OF FRACTIONATION OF ETHYL BENZENE
Original Filed Oct. 23, 1959
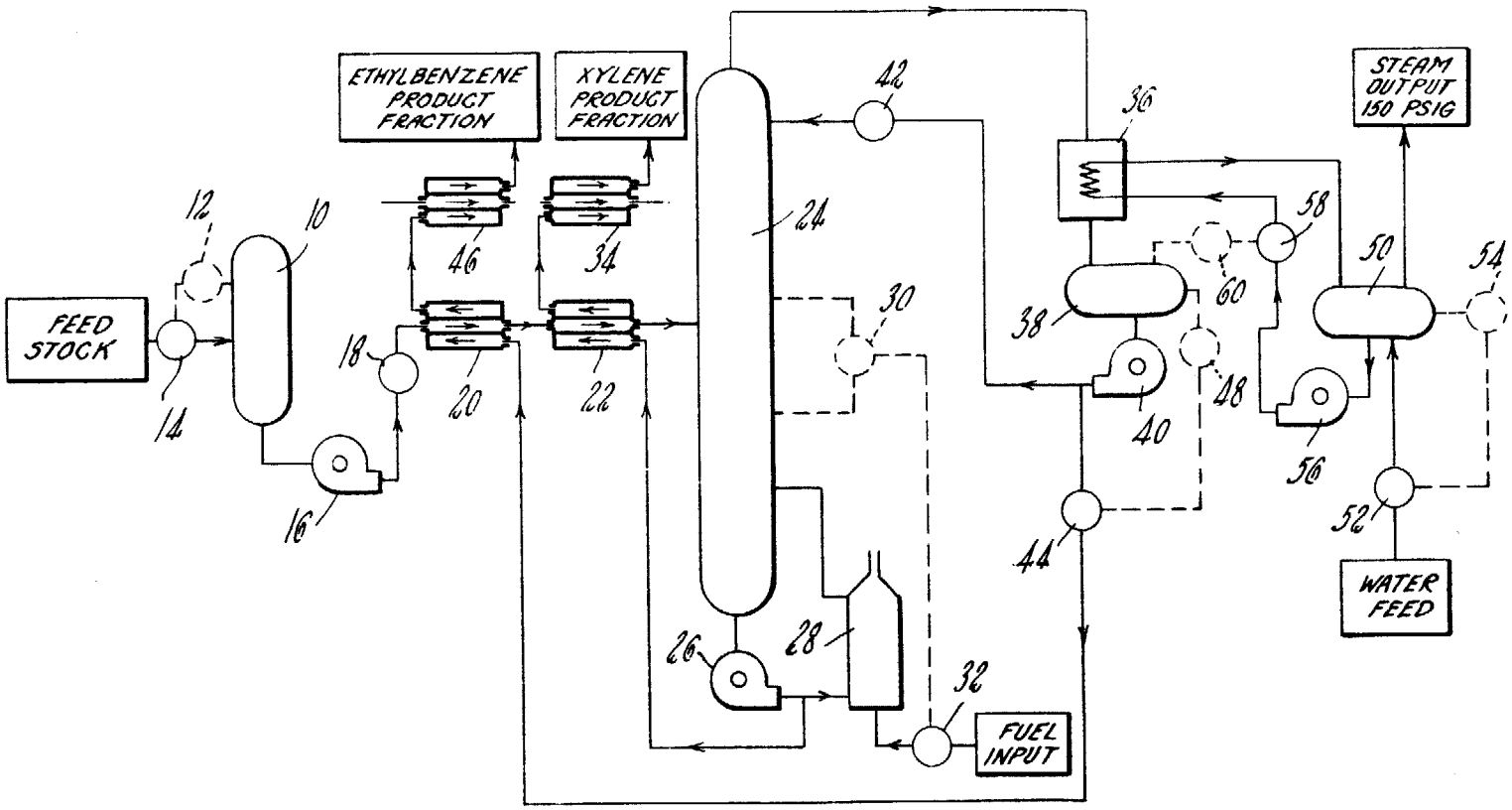

United States Patent Office

Re. 26,423
Reissued July 16, 1968

26,423

APPARATUS AND METHOD OF FRACTIONATION OF ETHYL BENZENE

Aaron K. Redcay, Florham Park, N.J., assignor to The Badger Co., Inc., a corporation of Massachusetts Original No. 3,265,590, dated Aug. 9, 1966, Ser. No. 379,432, June 23, 1964, which is a continuation of applications Ser. No. 848,389, Oct. 23, 1959, and Ser. No. 127,469, July 28, 1961. Application for reissue Jan. 13, 1967, Ser. No. 612,755

13 Claims. (Cl. 203—21)

Matter enclosed in heavy brackets [ ] appears in the original patent but forms no part of this reissue specification; matter printed in italics indicates the additions made by reissue.

The present application is a continuation of United States application Serial No. 848,389, filed October 23, 1959 and entitled "Ethyl Benzene Fractionation and Steam Generation System" and application Serial No. 127,469 filed July 28, 1961.

The present invention relates to a process for the separation of mixtures of ethyl benzene and meta, ortho and para xylenes, specifically a process for the separation of ethyl benzene of purity sufficient to manufacture polymer grade styrene and at the same time produce sufficient steam to make the process economical.

Until very recently the only method of manufacture of styrene grade ethyl benzene was to start with ethylene and benzene of suitable purity. The benzene had to be of a purity of the order of 99% while the ethylene purity was not extremely critical, provided that the impurities consisted of light paraffins inerts and/or hydrogen.

In spite of the fact that the mixed petroleum xylenes (which contain substantial percentages of ethyl benzene) are a readily available source of ethyl benzene, separation thereof had not been seriously attempted in view of the extremely close boiling points of the components of the mixture as well as their great similarity in chemical structure.

More recently a process for the distillation of ethyl benzene from the mixed petroleum xylenes has been proposed but this process operates at atmospheric pressure and possesses certain economic disadvantages. More specifically this process has been operated commercially in areas where fuel costs are low. However, the success of this operation is markedly improved if the operation is conducted in the manner described by this invention. Moreover, in areas where fuel costs are high, operation in the manner described by this invention may be the difference between success and failure.

Therefore, it is among the objects of this invention to provide a process for the manufacture of styrene grade purity ethyl benzene without the necessity of the use of pure starting material.

Another object of the present invention is to provide apparatus for fractionating ethyl benzene and the xylene isomers at elevated pressure, making it possible to reduce the physical size of the apparatus for a given through-put and making it possible to utilize waste heat from the fractionation for the generation of steam.

It is also among the objects of this invention to provide a process for the production of styrene grade ethyl benzene from readily available petroleum xylenes.

It is further among the objects of this invention to provide a process for effecting the separation of mixtures of ethyl benzene and meta, ortho and paraxylenes in an economical manner.

It is still further among the objects of this invention to provide a process for the separation of petroleum xylenes-ethyl benzene mixture wherein useful steam is generated.

It is still further among the objects of this invention to provide a process for the separation of mixed petroleum xylenes containing ethyl benzene wherein smaller and less expensive equipment may be used.

In practicing the present invention the readily available mixtures of ethyl benzene and ortho, meta and para-xylenes are distilled in a column under at least 2 p.s.i.g. The distillation is carried out in a multi-stage column and the refluxing ratio is from [40 to 200:1] *38 to 350:1.*

The mixture is separated into an overhead fraction and bottom fraction, the former containing styrene grade ethyl benzene (usually in excess of 99%), and the bottom fraction containing the remaining mixed xylenes. The overhead fraction is passed through a steam generating heat exchanger whereby useful quantities of steam at a pressure of at least 20 p.s.i.g. are produced. The ethyl benzene is entirely satisfactory for use in the manufacture of styrene, which in turn is used for various synthetic rubber formulations and the like.

The column should contain from 150 to 500 distillation stages and the column distillation pressure should be not over 150 p.s.i.g. By variation in distillation pressure, it has been found possible to generate steam at pressures up to about 785 p.s.i.g.

In the appended drawing there is shown a schematic flow sheet representing the apparatus and system of the present invention.

As shown in the drawing, the feed stock—which may consist of the usual mixture of ethyl benzene, ortho-xylene, meta-xylene and para-xylene and closely related hydrocarbons which results from a conventional isomerization procedure—is introduced into a feed accumulator 10 provided with a constant-level control 12 for inlet valve 14. From accumulator 10 the feed is pumped by means of centrifugal pump 16 through a constant-flow control valve 18 and through one side of each of heat exchangers 20, 22, whence it passes into fractionator column 24. Fractionator column 24 may be a conventional multiplate column adapted for operation at elevated pressures of the order of 23 to 150 p.s.i.g. As the feed stock enters column 24, its temperature will have been raised close to the boiling point by means of the heat exchangers 20, 22, the heat supplies for which will be described below. The necessary heat for vaporizing the feed stock is supplied by recirculating the liquid at the bottom of the tower through centrifugal pump 26 and heater 28. A differential pressure control 30 actuated by the differential pressure between spaced plates of column 24, i.e. between points in the column approximately 10 to 15 plates apart, is provided for controlling valve 32 which controls the input of fuel to heater 28. The portion of the bottoms which does not pass through heater 28 is passed through the second side of heat exchanger 22 in order to heat the incoming feed, thence through a water-cooled condenser 34 and to storage. The overhead from column 24, consisting primarily of ethyl benzene, is passed through one side of heat exchanger 36, thence into a reflux and product accumulator 38 from which the liquid overhead fraction is pumped by means of pump 40. A portion of the pump output passes through a constant-flow regulator 42 back to the top of column 24 in reflux, while the remaining portion of the output of pump 40 passes through valve 44 and through the second side of heat exchanger 20, serving to heat the feed stock, and finally through a water-cooled cooler 46 to storage. The volume of quantity of the overhead fraction passed to storage is controlled by valve 44 which in turn is controlled by a constant-level control device 48 mounted on accumulator 38.

The water feed for heat exchanger 36 which serves as the steam generator is introduced through a steam-water separator 50, the rate of introduction being controlled by valve 52 which in turn is controlled by a constant-level control device 54 mounted on the separator 50. Pump 56 pumps the water from separator 50 through valve 58 to heat exchanger 36, valve 58 being controlled by pressure regulator 60 responsive to the vapor pressure in reflux and product accumulator 38 which in turn of course is directly related to the pressure in column 24. Steam generated in heat exchanger 36 is returned to separator 50, whence it is withdrawn for use.

The differential pressure control of the fuel input for heater 28, together with the constant-flow control 18 on the stock input or feed, serves to maintain the operation of fractionator column 24 in a steady state within predetermined limits. Control of the water feed to heat exchanger 36 by means of valve 58 provides control of the absolute pressure within column 24. Inasmuch as operation of valve 58 is responsive to the vapor pressure within product accumulator 38 which in turn is equal to the pressure of the overhead fraction within column 24 except for whatever pressure drop occurs through heat exchanger 36, the absolute pressure within column 24 is maintained constant within predetermined limits. By maintaining the pressure within column 24 between 23 and 150 p.s.i.g., it is found that the temperature of the overhead entering heat exchanger 36 is from [306°] *342°* to [475°] *494°* F. This permits generation of steam within heat exchanger 36 at a temperature of 259° to 450° F. and at pressure of 20 to 405 p.s.i.g., or preferably at 281° to 450° F. and 35 to 405 p.s.i.g., which is within the range of usual industrial steam supplies.

It will be apparent from the foregoing that operation of the above-described fractionating system not only will effectively separate ethyl benzene from closely boiling xylenes and other hydrocarbon products but also will utilize waste heat from the fractionating operation to provide a supply of steam at industrially useful temperatures and pressures. Operation of fractionating column 24 at elevated pressure also makes it possible to reduce the physical size of the column required for a given through-put, thus reducing the cost of the installation. The system obviously may include two or more fractionator columns operated in tandem or even in sequence, if desired, and controlled in the same manner as described above for one column.

To more specifically illustrated the nature of the present invention, reference is made to the following examples:

EXAMPLE 1

A mixture of petroleum xylenes and ethyl benzene is distilled under 29 p.s.i.g. pressure (365° F.) in a multi-stage reflux column having 199 distillation stages. The reflux ratio is 72 to 1 and the overhead product produced is ethyl benzene of 99.8% purity. This product is suitable for the manufacture of styrene.

The overhead product generates steam at 90 p.s.i.g. on passage through a suitable steam generator.

EXAMPLE 2

A mixture of petroleum xylenes, ethyl benzene and toluene is distilled under 40 p.s.i.g. pressure (376° F.) in a multi-stage reflux column having 218 distillation stages. The reflux ratio is 77 to 1 and the overhead product is 92.06% pure ethyl benzene. This product on being cooled in a steam generator, generated steam at 150 p.s.i.g. and is suitable for the manufacture of styrene.

EXAMPLE 3

A mixture of petroleum xylenes and ethyl benzene is distilled in a multi-stage reflux column under 29 p.s.i.g. ([368°] *365°* F.). The column is provided with 179 distillation stages and the reflux ratio is 38 to 1. The overhead product is 99.8% pure ethyl benzene suitable for styrene manufacture. At the same time the overhead product generates steam at 90 p.s.i.g.

EXAMPLE 4

A mixture of petroleum xylenes and ethyl benzene is distilled in a multi-stage reflux column having 251 distillization stages under 29 p.s.i.g. pressure. The reflux ratio is 343 to 1 and the overhead product is 99.8% pure ethyl benzene. This product, suitable for styrene manufacture, generates steam at 90 p.s.i.g.

EXAMPLE 5

A mixture of petroleum xylenes and ethyl benzene is distilled in a multi-stage reflux column having 157 distillation stages under 2 p.s.i.g. pressure (286° F.). The reflux ratio is 58 to 1 and the overhead product is 99.8% pure ethyl benzene. The overhead product generates steam at 20 p.s.i.g. and is suitable for styrene manufacture.

EXAMPLE 6

A mixture of petroleum xylenes and ethyl benzene is distilled in a multi-stage reflux column under 150 p.s.i.g. pressure (494° F.). The column is provided with 239 distillation stages and the reflux ratio is 104 to 1. The overhead product is 99.8% pure ethyl benzene suitable for styrene manufacture. At the same time, the overhead product generated steam at 785 p.s.i.g.

EXAMPLE 7

A mixture of petroleum xylenes and ethyl benzene is distilled under 150 p.s.i.g. pressure (494° F.) in a multi-stage reflux column having 487 distillation stages. The reflux ratio is 117 to 1 and the overhead product is ethyl benzene of 99.8% purity and is suitable for the manufacture of styrene.

The overhead product generates steam at 785 p.s.i.g. on passage through a suitable steam generator.

The preferred range of conditions for the operation of this process are as follows:

| | Minimum | Maximum |
|---|---|---|
| Tower Distillation Pressure, p.s.i.g. | 30 | 65 |
| Reflux Ratio | 60 to 1 | 120 to 1 |
| Distillation Stages | 180 | 400 |
| Steam Generation Pressure, p.s.i.g. | 50 | 150 |

While only six specific examples of the present invention have been set forth, nevertheless such changes as will be apparent to one having reasonable skill in the art may be made without departing from the spirit thereof. For example, the feed may be preheated by the overhead (after it has left the steam generator) and/or by the bottoms and additional heat exchangers may be provided to further cool either the overhead or the bottoms if necessary or desirable. Thus it can be seen that the present invention is to be broadly construed and not to be limited except by the character of the claims appended hereto.

What is claimed is:

1. A method of separating a mixture of ethyl benzene and ortho, meta and para xylenes comprising distilling said mixture under at least 2 p.s.i.g. pressure and a temperature of at least 286° F. in a multi-stage column, refluxing said mixture at a ratio of from 38 to 350:1, whereby said mixture separates into an overhead fraction of styrene grade ethyl benzene and a bottom fraction, passing said overhead fraction from said column through a heat exchanger, and generating steam at a pressure of at least 20 p.s.i.g.

2. A method according to claim 1 wherein said overhead fraction consists of styrene grade ethyl benzene.

3. A method according to claim 1 wherein said column contains from 150 to 500 theoretical plates.

4. A method according to claim 1 wherein the pressure in said column is not over 150 p.s.i.g.

5. A method according to claim 1 wherein the pressure of said steam is not over 785 p.s.i.g.

6. Apparatus for the separation of a mixture comprising ethyl benzene, ortho-xylene, meta-xylene and para-xylene and for the production of steam comprising means for providing a feed of said mixture, a first heat exchanger having first and second sides, a second heat exchanger having first and second sides, a fractionating column, means for passing said feed through the first sides of both said heat exchangers and into said column, means for supplying heat to said column to vaporize at least a portion of said feed, a third heat exchanger having first and second sides, means for passing the vaporized overhead fraction from said column through the first side of said third heat exchanger to condense said fraction, means for passing a first portion of said condensed overhead fraction through the second side of said first heat exchanger, means for passing a second portion of said condensed overhead fraction back to said column in reflux means for passing the liquid bottom fraction from said column through the second side of said second heat exchanger, means for passing water through the second side of said third heat exchanger to generate steam, and means responsive to the differential pressure between spaced plates within said column for controlling the quantity of heat supplied to said column and pressure-responsive means for controlling the quantity of water supplied to said third heat exchanger to maintain the operating pressure within said column above 23 p.s.i.g. and to generate said steam at a pressure of at least 20 p.s.i.g.

7. Apparatus as defined in claim 6 in which said pressure-responsive means includes in addition means responsive to the vapor pressure of said overhead fraction for controlling the water input to said third heat exchanger.

8. Apparatus for separating ethyl benzene from admixture with xylenes which consists in a substantially vertical fractionating column, a heater having a connection from the bottom of said column for flow of liquid, an exit from said heater for said liquid into the lower part of said column, said heater adapted to heat said liquid to a temperature of about [306°–475°] *347°–494°* F., means for maintaining a pressure of about 23–150 p.s.i.*g.* in said column, a differential pressure control at the central part of said column connected to said heater to control the supply of fuel thereto, a first heat exchanger connected to the central part of said column and through which said admixture is adapted to flow into said column, a second heat exchanger and a connection from the upper part of said column thereto for flow of vapors to be condensed therein, a steam generator in said second heat exchanger with means for maintaining superatmospheric pressure in said steam generator, an accumulator connected to said second heat exchanger for holding said condensed vapors.

9. Apparatus according to claim 8 in which there is a connection for flow of condensed vapors from said accumulator through said first heat exchanger in heat exchange relation to said admixture.

10. Apparatus according to claim 8 in which there is a connection from the bottom of said column for flow of liquid through a third head exchanger in heat exchange relation to said admixture.

11. A method of separating ethyl benzene from admixture with xylenes which consists in preheating said mixture, introducing said mixture into the central portion of a fractionating column; maintaining a pressure of about 23–150 p.s.i.*g.* in said column, heating said column by circulating a portion of said mixture through a heater to produce a temperature of about [306°–475°] *347°–494°* F. in the vapors exiting from the top of said column; controlling said temperature by the difference in pressure between vertically spaced points in said column; passing said vapors into heat exchange relation with water at a temperature of about 259°–450° F. thereby forming a mixture of steam and water, said vapors being condensed; returning a portion of said condensate to the upper part of said column, and recovering the remainder as ethyl benzene; and separating the steam from the water at superatmospheric pressure.

12. A method according to claim 11 wherein the pressure in said column is not over 150 p.s.i.g.

13. A method according to claim 11 wherein the pressure of said steam is not over 405 p.s.i.g.

References Cited

The following references, cited by the Examiner, are of record in the patented file of this patent or the original patent.

UNITED STATES PATENTS

| | | | |
|---|---|---|---|
| 2,489,949 | 11/1949 | Blair | 202—160 |
| 2,509,136 | 5/1950 | Cornell | 202—160 X |
| 2,696,465 | 12/1955 | Kittredge | 202—185 |
| 2,726,275 | 12/1955 | Lien et al. | 260—674 X |
| 2,959,626 | 11/1960 | Krausse et al. | 203—84 X |

NORMAN YUDKOFF, *Primary Examiner.*

WILBUR L. BASCOMB, Jr., *Examiner.*

F. E. DRUMMOND, *Assistant Examiner.*